United States Patent [19]

Kamperman

[11] Patent Number: 4,519,655

[45] Date of Patent: May 28, 1985

[54] STORAGE CONTAINER

[76] Inventor: Charles F. Kamperman, 2596 Matterhorn Dr., Wexford, Pa. 15090

[21] Appl. No.: 487,746

[22] Filed: Apr. 22, 1983

[51] Int. Cl.³ .............................................. A47B 81/06
[52] U.S. Cl. ...................................... 312/12; 206/387; 312/15; 312/111; 312/322; 312/323; 312/325
[58] Field of Search ..................... 312/12, 13, 15, 111, 312/322, 323, 325; 206/387; 211/40, 41

[56] References Cited

U.S. PATENT DOCUMENTS

| | | | |
|---|---|---|---|
| 357,533 | 2/1887 | Miller | 312/326 |
| 1,015,844 | 1/1912 | Scholl | 312/12 |
| 2,720,438 | 10/1955 | Musick | 312/12 |
| 3,552,817 | 1/1971 | Marcolongo | 312/111 |
| 4,067,629 | 1/1978 | Amatsu et al. | 312/15 |
| 4,278,174 | 7/1981 | LeBlank | 312/111 |

FOREIGN PATENT DOCUMENTS 2837609 3/1980 Fed. Rep. of Germany ...... 206/387

Primary Examiner—Victor N. Sakran
Assistant Examiner—Joseph Falk
Attorney, Agent, or Firm—Webb, Burden, Robinson & Webb

[57] ABSTRACT

A container having a shell with an open front forming a storage compartment and a door pivotally connected to the shell to close the front of the storage compartment. A slide having a contact leg at its rear edge is located at the bottom of the storage container and is pivotally connected at its forward edge to the door. The pivotal connection between the slide and the door is located above the pivotal connection between the door and the shell when the door is in the closed position. When the door is pivoted into the open position, the slide is moved forwardly out of the storage compartment by the pivotal connection between the forward edge of the slide and the door and the contact leg on the slide contacts an item resting on the slide to move the item out of the storage compartment.

9 Claims, 6 Drawing Figures

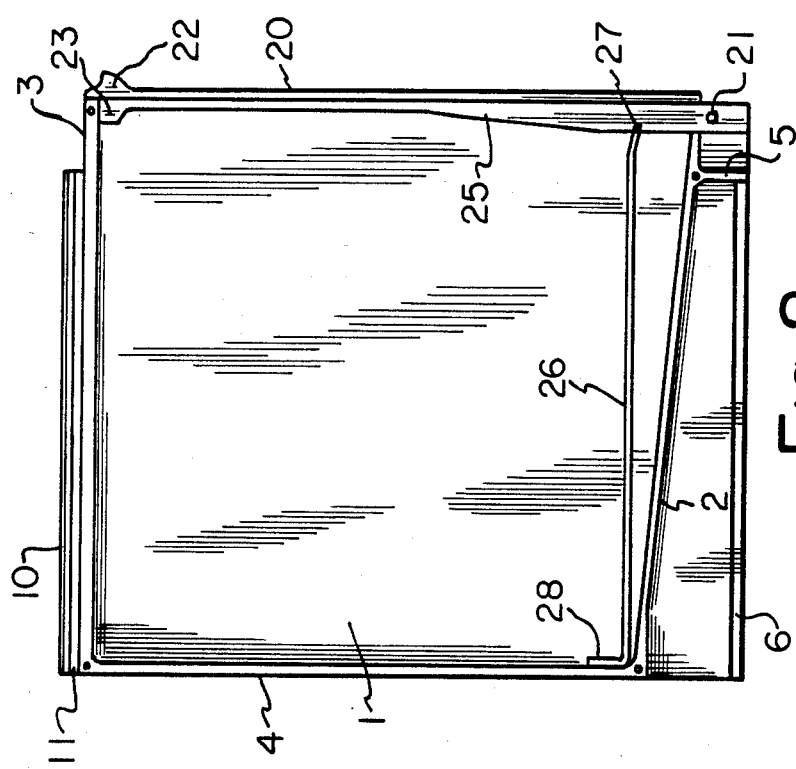
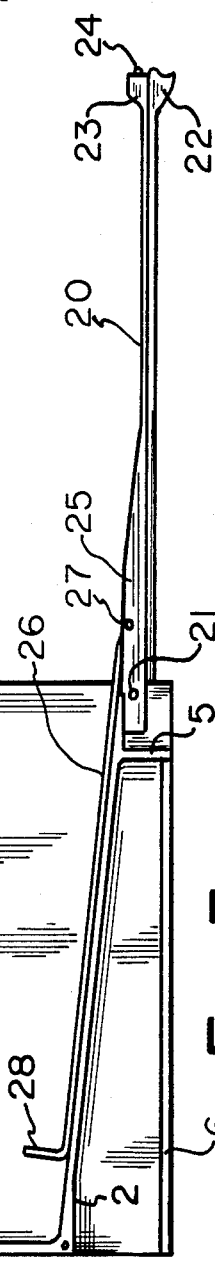
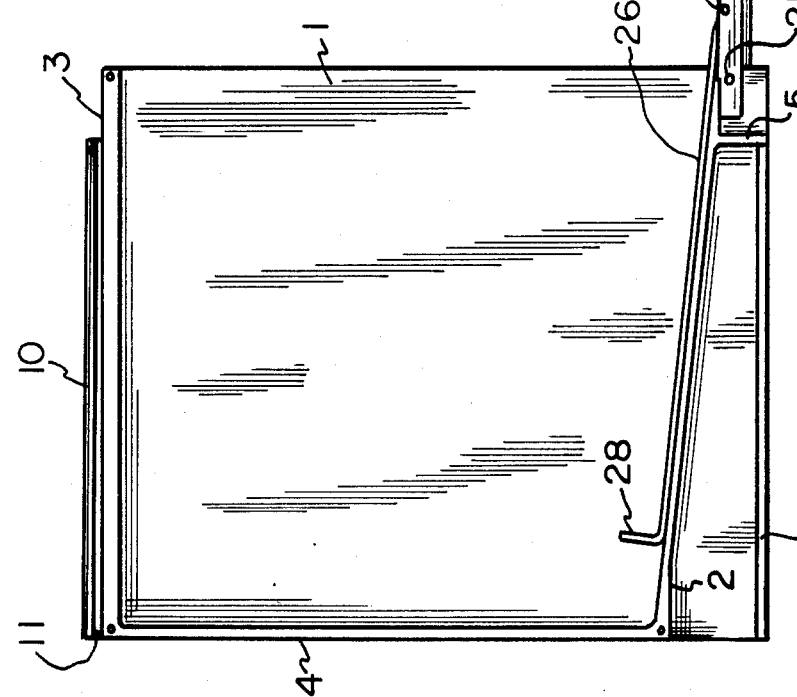
Fig. 2
Fig. 3

STORAGE CONTAINER

BACKGROUND OF THE INVENTION

1. Field of the Invention

The invention relates generally to a container providing a closed compartment for receiving items such as floppy diskettes, computer data tapes on reels or cartridges, video game cartridges, audio tapes on reels or cartridges, video tapes on reels or cartridges, photographic film on reels or cartridges, phonograph records and the like which should be stored in a dust-free environment. Particularly, the container of the invention provides a light weight, inexpensive storage case for the above items which has a unique closure and slide arrangement whereby when the closure is opened, the slide upon which the stored item rests is indexed in an outward direction so that the item is moved partially out of the storage compartment so that its edge may be grasped to remove it from the storage compartment formed by the container. The container also provides an organizing capability for stored items since each container may be connected to a plurality of identical containers to form a self-contained storage unit.

2. Description of the Prior Art

Storage containers are disclosed in U.S. Pat. Nos. 4,162,112; 4,339,162 and 4,270,817. However, none of these patents discloses a container having a front closure member so that the item stored in the storage compartment of the container is protected from dust. This is extremely important with expensive disks and computer data tapes on both reels and cartridges because of the importance of the information which is stored thereon. Additionally, many of the prior art containers utilize a separate mechanical mechanism for biasing the second item out of the storage compartment, and such adds to the expense of the container and to the likelihood of breakage. Typical of such an arrangement are the containers disclosed in U.S. Pat. Nos. 4,162,112; 4,270,817 and 4,275,943.

SUMMARY OF THE INVENTION

The invention is a container for storing disks and tapes which includes a housing having a manually operated closure member which is pivoted to the housing and also pivoted to a movable slide in the bottom of the housing. The double pivots are arranged so that when the closure member is opened, the slide is moved in a direction out of the storage compartment of the container. The free end of the slide is formed with an upstanding lip which contacts the rear edge of the stored item which is resting on the upper surface of the slide and moves the item partially out of the storage compartment when the closure member is opened so that the item may be grasped and completely removed from the storage compartment. The container is provided with spaced elongated feet on the bottom which support the container in the upright position and which may be interlocked with a T channel member on the top of another identical container so that the containers may be vertically stacked. Additionally, the exterior of one sidewall of the container is formed with tongues which cooperate with grooves on the exterior of the opposite sidewall of another identical container so that adjacent containers may be attached in a row. A plurality of interlocked individual identical containers can be attached by this arrangement to form a self-contained storage unit. As the disk and/or tape library expands, additional containers may be easily and quickly slid into place.

BRIEF DESCRIPTION OF THE DRAWINGS

The present invention is further described with reference to the accompanying drawings wherein like reference numerals refer to like parts and:

FIG. 2 is a vertical section through one embodiment of the container with a sidewall removed and the closure member in the closed position;

FIG. 3 is a vertical section of the container shown in FIG. 2 with the closure member in the open position;

FIG. 4 is a front view of a container with the closure member and the slide removed;

DESCRIPTION OF THE PREFERRED EMBODIMENT

Figure 1:
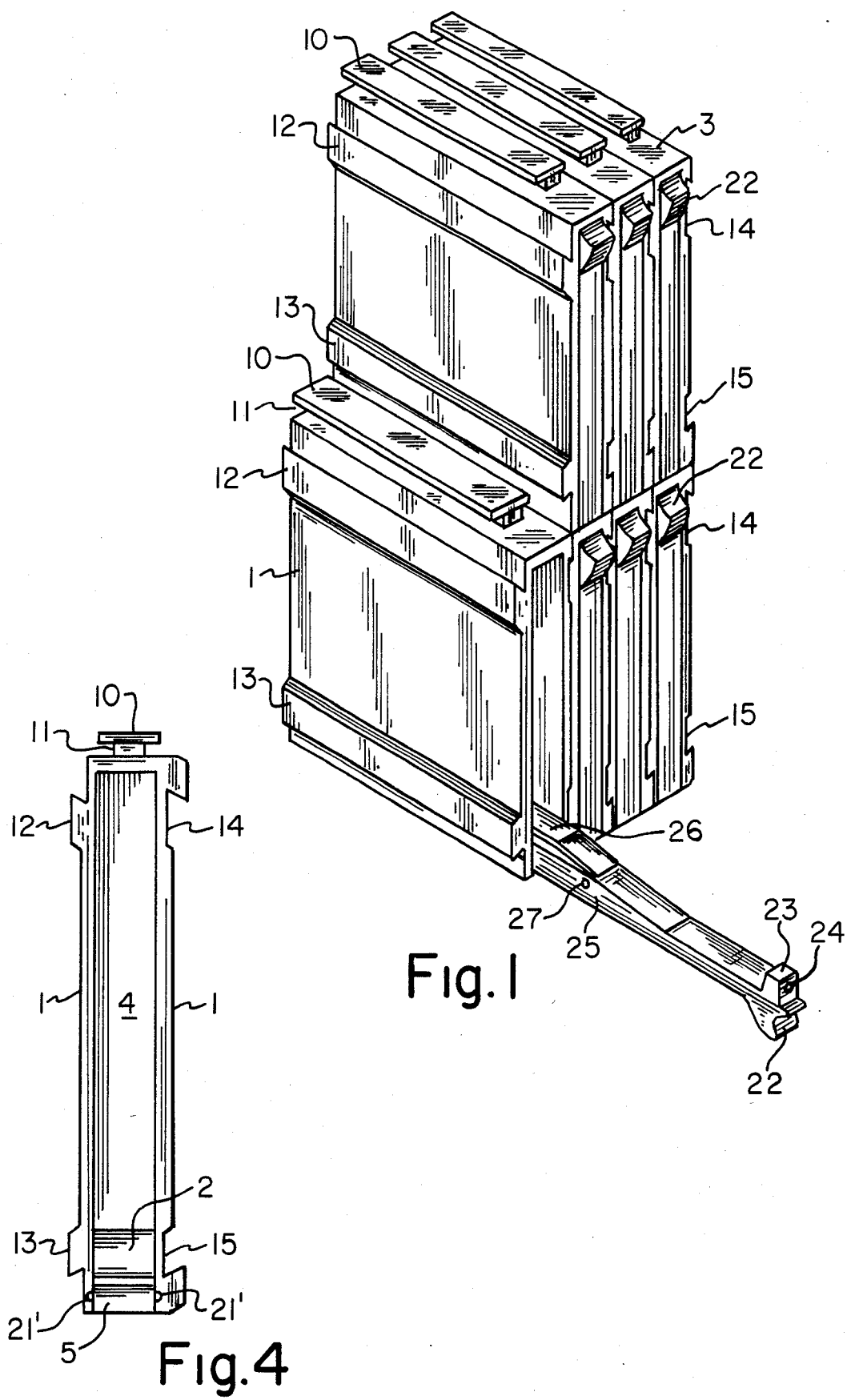
FIG. 1 is a perspective view showing a plurality of containers horizontally and vertically interconnected to form a self-contained unit.

With reference to FIGS. 1-4 of the drawings, the container consists of a shell and a closure member. The shell has a pair of spaced substantially parallel sidewalls 1, a sloped bottom wall 2, a top wall 3 and a rear wall 4. The walls of the shell are integral and are injection molded from a rigid fire proof thermoplastic polymer which can be either transparent or opaque. The polymer may be polystyrene, acrylonitrile-butadiene-styrene (ABS) copolymer, polymethyl methacrylate, polycarbonate or polyethylene terephthalate and the like.

As shown in FIGS. 2 and 3 of the drawings, the bottom wall 2 of the shell is formed with a slight downward slope from the rear wall 4 to the open front for a purpose to be described hereinafter. An inwardly extending elongated foot 6 is located at the lower edge of each sidewall. The forward end of each inwardly extending foot 6 terminates at downwardly extending leg 5 which supports the forward end of sloped bottom wall 2. The inwardly extending feet 6 support the container and function as tongues or slides to cooperate with grooves 11 formed by a T-shaped channel member 10 which is molded on the outer surface of top wall 3 of the shell. This tongue and groove arrangement makes it possible to interlock containers in a vertical stack in the manner shown in FIG. 1 of the drawings.

The exterior surface of one sidewall 1 of the shell is formed with an elongated horizontally extending member 12 adjacent to its upper edge and an elongated horizontally extending member 13 adjacent to its lower edge as shown in FIGS. 1 and 4 of the drawings. A pair of grooves or channels 14 and 15 are molded in the outer surface of the sidewall opposite the sidewall having members 12 and 13. The angles of member 12 and groove 14 are complementary as are the angles of member 13 and groove 15. Groove 14 will receive a member 12 and groove 15 will receive a member 13 to interconnect two containers in a horizontal row as shown in FIG. 1.

A closure member 20 is pivotally attached to the forward end of the shell by means of a pair of horizontal lugs 21 which are molded at the lower end of the closure member and extend outwardly into horizontal recesses 21' molded in the inner surface of sidewalls 1 adjacent at the lower forward corner. As will be seen in FIG. 3 of the drawings, the lower end of closure member 20 below lugs 21 acts as a stop to contact the forward lower surface of sloped bottom wall 2 to prevent further rotation of the closure member when the closure member is in the open position. The upper end of the closure member is formed with a rounded handle portion 22 which may be engaged by the user's thumb or finger and with a stop portion 23 on the interior surface. Stop portion 23 fits within the shell and is close to the inner surface of top wall 3 of the shell. The stop portion is formed with a slight protrusion 24 which frictionally engages the inner surface of top wall 3 when closure member 20 is in the closed position.

As can be seen in FIGS. 2 and 3 of the drawings, a slide 26 is located above bottom wall 2 and is pivotally attached by a pair of outwardly extending horizontal lugs 27 which are molded at the forward end of the slide to the lower end of closure member 20 above lugs 21. Lugs 27 fit into horizontal holes formed in the inner surface of spaced parallel side webs 25 which are integrally molded at the lower end of closure member 20. An upstanding leg 28 is formed at the rear end of slide 26. Leg 28 has a uniplanar contact surface which contacts the rear of the item stored within the shell and moves the item forward along with the slide when closure member 20 is pivoted into the open position so that the forward edge of the item extends out of the front shell. The movement of slide 26 is caused by the relative location of pivot lugs 21 and 27 on closure member 20. Sloped base 2 is necessary so that as closure member 20 nears the end of its opening arc, the slide is not deflected upwardly which could cause the upper edge of the stored item to contact the inner surface of top wall 3 and jam in the storage compartment. While not shown in the drawings, it will be understood by those skilled in the art that the upper surface of slide 26 may be formed with a plurality of grooves for storing multiple items or with V-shape for storing round items such as reels.

Figure 5:
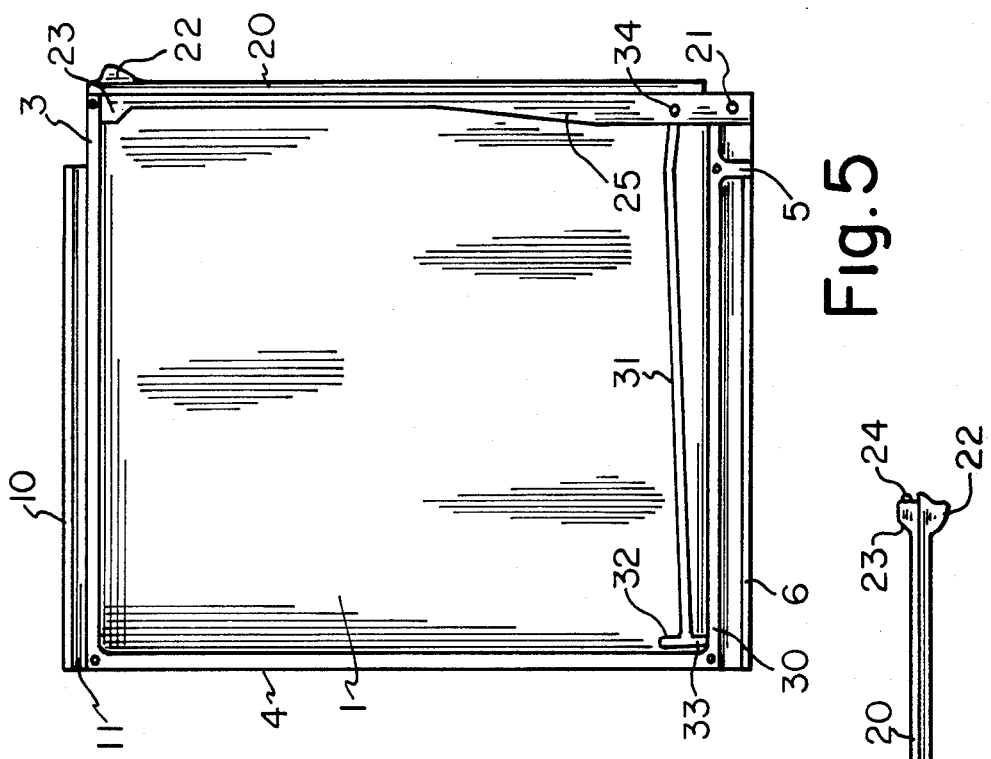
FIG. 5 is a vertical section through a second embodiment of the container with a sidewall removed and the closure member in the closed position.
Figure 6:
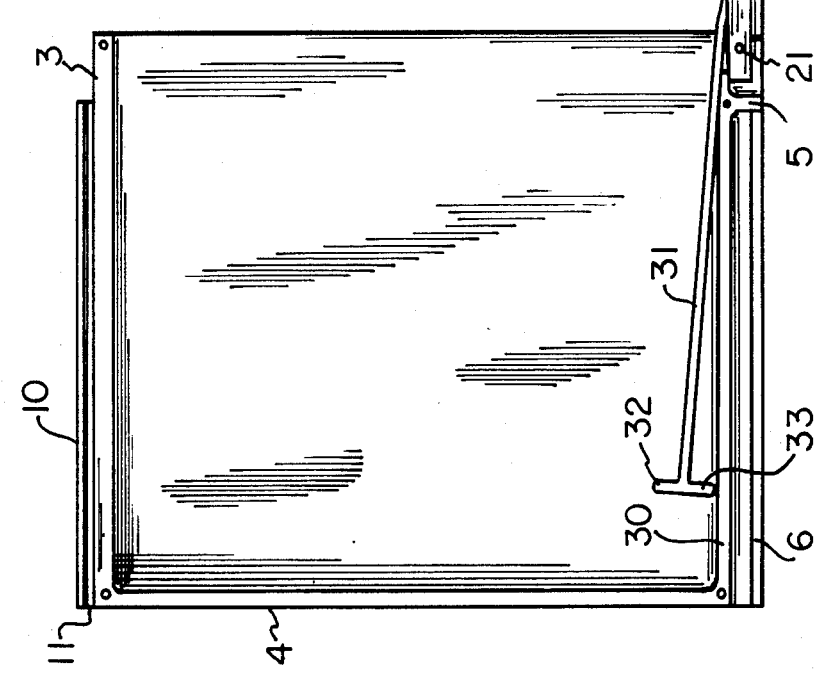
FIG. 6 is a vertical section of the container shown in FIG. 5 with the closure member in the open position.

The embodiment shown in FIGS. 5 and 6 of the drawings is identical with the embodiment shown in FIGS. 2 and 3 except that the bottom wall 30 of the shell is flat in FIGS. 5 and 6 and slide 31 is T-shaped. Slide 31 has a cross member at its inner end which has an upstanding contact leg 32 and a depending leg 33. The end of depending leg 33 rides along the upper surface of bottom wall 30 when slide 31 is moved out of the storage compartment of the container. Each edge of the forward end of slide 31 is provided with an outwardly extending lug 34 and these lugs fit into holes in the webs 25 of closure member 20 in the same manner as the lugs 27 on slide 26 fit into holes in the webs 25 of closure member 20 in the embodiment shown in FIGS. 2 and 3. As will be apparent from the above description of FIGS. 5 and 6 of the drawings, when closure member 20 is pivoted about lugs 21, slide 31 is pulled forwardly by means of the connection between lugs 34 and webs 25 on the closure member. The lower end of leg 33 rides along the upper surface of bottom wall 30 and the upper leg 32 has a uniplanar contact surface which contacts the corner of the item being stored and pulls the item out of the storage compartment of the container so that it may be grasped by a user and completely removed from the container.

In operation, when an item is resting on the upper surface of slide 26 or 31 in the storage compartment and closure member 20 is pivoted into the open position as shown in FIGS. 1, 3 and 6 of the drawings, the relationship between pivot lug 21 and pivot lug 27 or 34 permits the closure member to open and at the same time pull slide 26 or 31 and an item resting thereon forward out of the storage compartment of the container so that the front end of the slide extends outwardly of the shell, and the contact leg at the rear of the slide pulls the stored item resting on the slide forward so that its edge can be grasped by a user.

While the shell of the invention is shown as being rectangular in shape, it will be understood by those skilled in the art that it can be square or more elongated in either the horizontal or vertical dimension depending upon the shape of the item to be stored therein. Also, the width of the storage compartment may be varied according to the thickness of the items being stored.

The container of the invention has numerous applications such as the storage of floppy disks in any of the standard, mini or micro sizes; the storage of computer data tapes in both reel and cartridge form and the storage of game cartridges and the like. Additionally, the case may be used to store audio and video tapes in both reel and cartridge form as well as photographic film in both reel and cartridge form. Also, with appropriate dimensioning, the case may be used to store phonograph records, books and magazines.

While preferred embodiments of the invention have been described herein, it is to be understood that the invention may be embodied within the scope of the appended claims.

I claim:

1. A storage container having a shell with an open front forming a storage compartment and a closure member adapted to close the front of said shell, said shell having a pair of spaced substantially parallel sidewalls, a top wall, a rear wall and a bottom wall extending between said spaced sidewalls, an elongated rigid slide at the bottom of said shell located above said bottom wall for supporting at least one item within said shell, said closure member being pivotally connected to the lower forward corners of said spaced sidewalls, a pivotal connection between the forward end of said rigid slide and said closure member, said pivotal connection between said rigid slide and said closure member being located above the pivotal connection between said closure member and said sidewalls when said closure member is in the closed position, and a contact leg on the rear end of said rigid slide, whereby when said closure member is pivoted into the open position, said rigid slide is moved forwardly by means of the pivotal connection between the forward end of said rigid slide and said closure member and said contact leg is adapted to contact an item resting on said rigid slide to move a portion of the item through the open front of said shell.

2. A storage container as set forth in claim 1 wherein said closure member has a bottom end portion located below said pivotal connection between said closure member and said lower forward corners of said spaced sidewalls and said bottom end portion contacts the lower surface of said bottom wall to act as a stop when said closure member is in the open position.

3. A storage container as set forth in claim 1 including stop means located at the upper end of said closure member to hold said closure member in the closed position until it is moved.

4. A storage container as set forth in claim 1 including an inwardly extending elongated foot at the lower edge of and integral with each of said spaced sidewalls, a channel member on the outer surface of said top wall and integral with said top wall, said channel member having an elongated groove formed on each side thereof, whereby said inwardly extending feet may fit within grooves formed by a channel member on an adjacent container when a plurality of containers are vertically stacked as a unit.

5. A storage container as set forth in claim 1 including spaced substantially parallel elongated members on the outer surface of one of said spaced sidewalls, spaced channels formed on the outer surface of the other of said spaced sidewalls, whereby each of said elongated members may fit within a channel on another container to interlock adjacent containers when a plurality of containers are arranged as a unit in a horizontal row.

6. A storage container as set forth in claim 1 wherein said bottom wall is sloped downwardly from the intersection of said bottom wall and said rear wall toward said open front.

7. A storage container as set forth in claim 1 wherein said bottom wall is substantially horizontal and said slide is T-shaped having a depending leg with its end resting on said bottom wall and an upstanding leg forming said contact leg adapted to contact an item stored on said slide.

8. A storage container as set forth in claim 1 wherein said contact leg has a uniplanar contact surface adapted to contact an item resting on said slide.

9. A storage container as set forth in claim 7 wherein said contact leg has a uniplanar contact surface adapted to contact an item stored on said slide.

* * * * *